(12) United States Patent
Tamura et al.

(10) Patent No.: US 6,479,293 B1
(45) Date of Patent: *Nov. 12, 2002

(54) TEMPERATURE INDICATING MATERIAL AND TEMPERATURE MONITORING MEMBER

(75) Inventors: Toshiyuki Tamura, Mishima; Yuichiro Hatanaka, Shizuoka-ken, both of (JP)

(73) Assignee: Toshiba Tec Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/497,890

(22) Filed: Feb. 4, 2000

(30) Foreign Application Priority Data

| Feb. 5, 1999 | (JP) | 11-028288 |
|---|---|---|
| May 24, 1999 | (JP) | 11-143316 |
| May 24, 1999 | (JP) | 11-143317 |
| Dec. 21, 1999 | (JP) | 11-362883 |

(51) Int. Cl.$^7$ ............................................. G01N 31/22
(52) U.S. Cl. ................... 436/2; 436/1; 436/7; 436/166; 422/57
(58) Field of Search .................. 436/7, 1, 2; 252/408.1; 106/31.58, 31.86, 33.32, 31.64

(56) References Cited

U.S. PATENT DOCUMENTS

| 4,002,593 | A | * | 1/1977 | Jones ............................ 260/40 |
| 4,028,118 | A | * | 6/1977 | Nakasuji et al. .............. 106/21 |
| 4,091,001 | A | * | 5/1978 | Berger .......................... 260/75 |
| 4,097,465 | A | * | 6/1978 | Berger .......................... 260/75 |
| 4,097,466 | A | * | 6/1978 | Berger .......................... 260/75 |
| 4,116,924 | A | * | 9/1978 | Peabody ....................... 260/40 |
| 4,720,301 | A | * | 1/1988 | Kito et al. .................... 106/21 |
| 4,737,463 | A | * | 4/1988 | Bhattacharjee et al. ........ 436/2 |
| 5,364,132 | A | * | 11/1994 | Haas et al. ................... 283/67 |
| 5,558,699 | A | * | 9/1996 | Nakashima et al. .......... 106/21 |
| 5,558,700 | A | * | 9/1996 | Shibahashi et al. ........... 106/21 |
| 5,591,255 | A | * | 1/1997 | Small et al. .................. 106/21 |
| 5,663,115 | A | | 9/1997 | Naito et al. |
| 5,756,356 | A | * | 5/1998 | Yanagi et al. .................. 436/7 |
| 5,879,443 | A | * | 3/1999 | Senga et al. ................ 106/498 |

FOREIGN PATENT DOCUMENTS

| GB | 2 135 466 | 8/1984 |
| JP | 8-197853 | 8/1996 |

* cited by examiner

Primary Examiner—Jill Warden
Assistant Examiner—Jennine Brown
(74) Attorney, Agent, or Firm—Oblon, Spivak, McClelland, Maier & Neustadt, P.C.

(57) ABSTRACT

In the present invention, a temperature indicating material is prepared by incorporating, in a rewritable base system which comprises an electron donating compound, an electron accepting compound and a reversal material and undergoes color changes with temperature and time, a thermochromism controller which changes a rate of crystal to amorphous or phase-separation to non-phase-separation rate. Upon color changes with an environmental temperature, the thermochromism controller undergoes crystallization or phase separation to have a function as a place for reaction and contributes to the color changes of the temperature indicating material. The incorporation of the thermochromism controller therefore makes it possible to impart the resulting temperature indicating material with improved sensitivity to temperature at around an environmental temperature and a high S/N ratio.

7 Claims, 10 Drawing Sheets

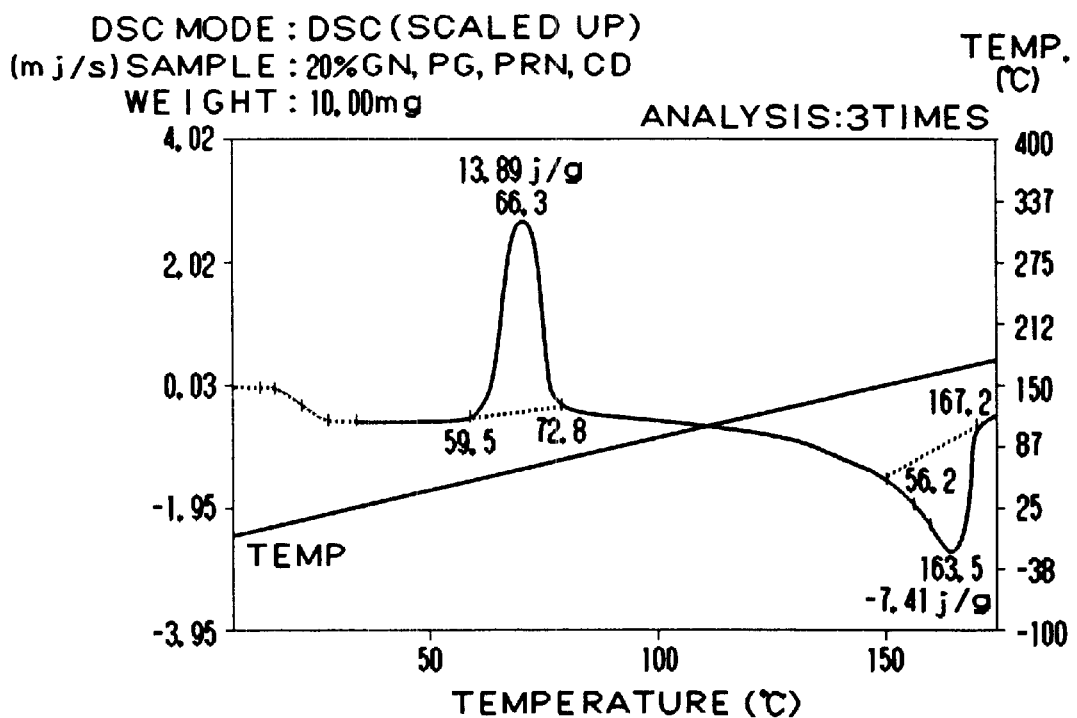
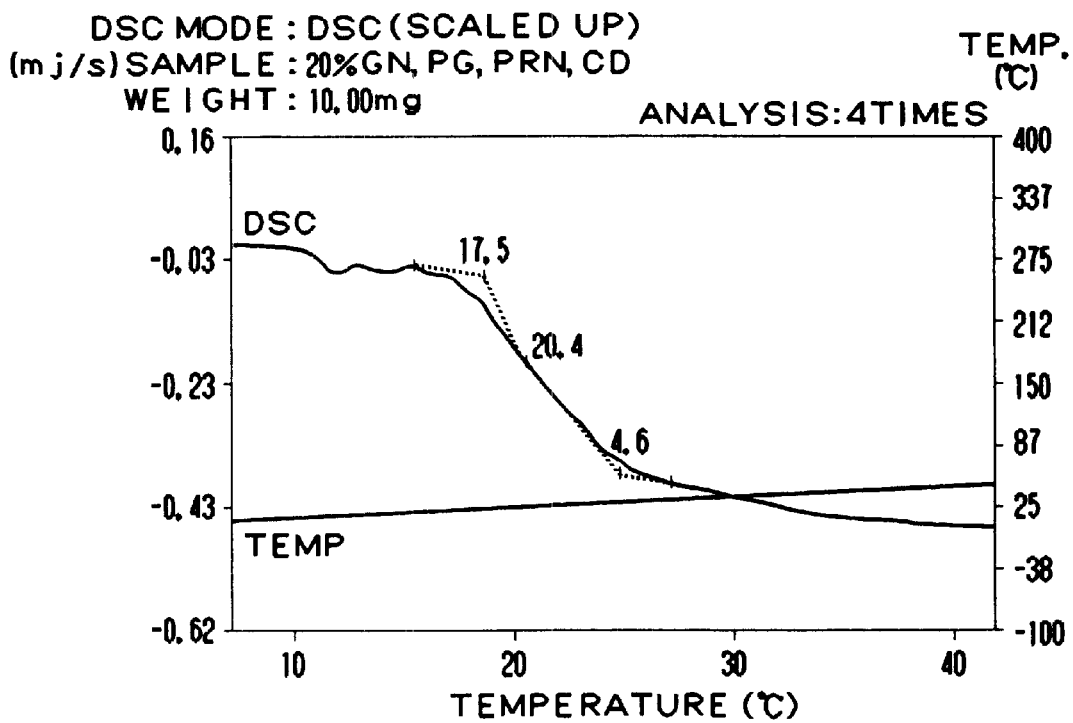

TEMPERATURE INDICATING MATERIAL AND TEMPERATURE MONITORING MEMBER

BACKGROUND OF THE INVENTION

1. Field of the Invention

The present invention relates to a temperature indicating material suited for the formation of a temperature monitoring label or the like used for the monitoring of an environmental temperature. This invention relates to a temperature monitoring member which is produced using a temperature indicating member which undergoes color changes with temperature and is used for the temperature monitoring of vegetables and fruits, perishable foods and the like.

2. Description of the Prior Art

As a temperature indicating material which undergoes color changes with temperature, thermochromic organic pigments, for example, ethylene derivatives substituted with a condensed aromatic ring such as spiropirans bianthrone or dixanthylene, crystals of a metal complex salt composed of $CoCl_2 \cdot 2 \ (CH_2)_6N_4 \cdot 10H_2O$, combinations of an electron donating compound, an electron accepting compound and a polar organic compound and the like have conventionally been put on the market. Upon use of a temperature monitoring label prepared from such a temperature indicating material, color changes with temperature are judged visually.

Roughly speaking, there are two types of temperature indicating materials, that is, a reversible type and irreversible type. In the former one, the color changes unlimitedly in response to a temperature increase or decrease, while in the latter one, the color which has once changed at a certain temperature does not show any further change.

The reversible type material is used for indicating the time good for drinking of beer or the like, or for visually attracting attentions to a temperature change.

The irreversible type material is used for the temperature monitoring of fruits and vegetables, or perishable foods. The temperature indicating material which has stored its thermal history is disclosed in Japanese Patent Publication No. SHO 58-10709, wherein an ink having a viscosity changeable with temperature (for example, an ink which has a pigment dissolved in oleyl alcohol) penetrates in a penetration material and the length of the ink penetrated in the material indicates how long it is exposed to a temperature not lower than a predetermined temperature. In addition, there is an irreversible temperature indicating material for temperature monitoring which has a plurality of layers formed on a label. These plurality of layers are an ink layer, a separate layer, a porous layer and an indicator and they are stacked one after another. The separate layer is removed when the temperature monitoring is started, while the porous layer controls the penetration time of the ink from the ink layer until it reaches the indicator. For such a temperature monitoring member, a storing device (separator or the like) prior to the starting of temperature monitoring is important, but it is expensive and in addition, has such a complex structure that a desired printing pattern cannot be adopted. Moreover, this material needs a cumbersome operation such as removal of the separator or the like upon initiation of the temperature monitoring.

As an improved process, a process using a rewritable material is disclosed in Japanese Patent Application Laid-Open No. 197853/1996, wherein the glass transition point of the material is used as a preset temperature and temperature monitoring is effected by making use of the fact that a drastic change in the diffusion rate of molecules occurs at a temperature exceeding the glass transition point.

The phase separation controller described in this Japanese Patent Application Laid-Open No. 197853/1996 is employed for accelerating the color developing rate at high temperatures, but cannot improve the properties necessary as thermochromic characteristics (characteristics of accelerating color development at a temperature not lower than a preset temperature in spite of slow color development at a temperature not higher than the preset temperature).

The problems of such a prior art will next be described. In the process using a rewritable material, a system which shows a drastic change in a color developing rate at a temperature not lower than the glass transition point after initial decolorization is utilized. The temperature monitoring material in this case has a mechanism of developing color owing to the association of a developer which has been diffused as a result of the phase separation between a reversal material and the developer with a leuco dye so that color development gradually proceeds even at a temperature not higher than the glass transition point. A density change with temperature is however small, so it is necessary to heighten the sensitivity in practical use. The phase separation controller for raising the color developing rate at high temperatures cannot serve as a temperature indicating material, since it has a high color developing rate even at low temperatures. In addition, the color density upon decolorization is not complete and a density ratio (S/N ratio) of decolorized state to color-developed state by temperature is low.

SUMMARY OF THE INVENTION

An object of the present invention is therefore to provide a temperature indicating material which has thermochromic characteristics sensitive at an environmental temperature and has a high S/N ratio.

In one aspect of the present invention, there is thus provided a temperature indicating material which comprises an electron donating compound, an electron accepting compound and a reversal material and undergoes color change with temperature and time, characterized in that said temperature indicating material further comprises a thermochromism controller which plays a role of changing a rate from crystal to amorphous or from phase separation to non-phase-separation and upon discoloration by an environmental temperature, crystallizes or undergoes phase separation to provide a place for reaction, thereby contributing to the discoloration of the temperature indicating material.

In another aspect of the present invention, there is also provided a temperature monitoring member which is prepared using a temperature indicating member obtained by incorporating, in a material which comprises an electron donating compound, an electron accepting compound and a reversal material, is initialized upon initiation of temperature monitoring and undergoes color changes with temperature and time, a cycloalkanol or cycloalkane diol which has stable crystalline conditions within a temperature monitoring range; and by printing or coating information to a base material.

BRIEF DESCRIPTION OF THE DRAWINGS

A more complete appreciation of the present invention and many attendant advantages thereof will be readily obtained as the same becomes better understood by reference to the following detailed description when considered in connection with the accompanying drawings, in which:

FIG. 7(A) is a graph illustrating the properties of differential scanning calorimetry (DSC), over a wide temperature range, of the temperature indicating material of the present invention obtained in Example 1, FIG. 7(B) is a graph illustrating the properties of differential scanning calorimetry (DSC), within a working range, of the temperature indicating material of the present invention obtained in Example 1;

DETAILED DESCRIPTION OF THE PREFERRED EMBODIMENTS

Figure 1:
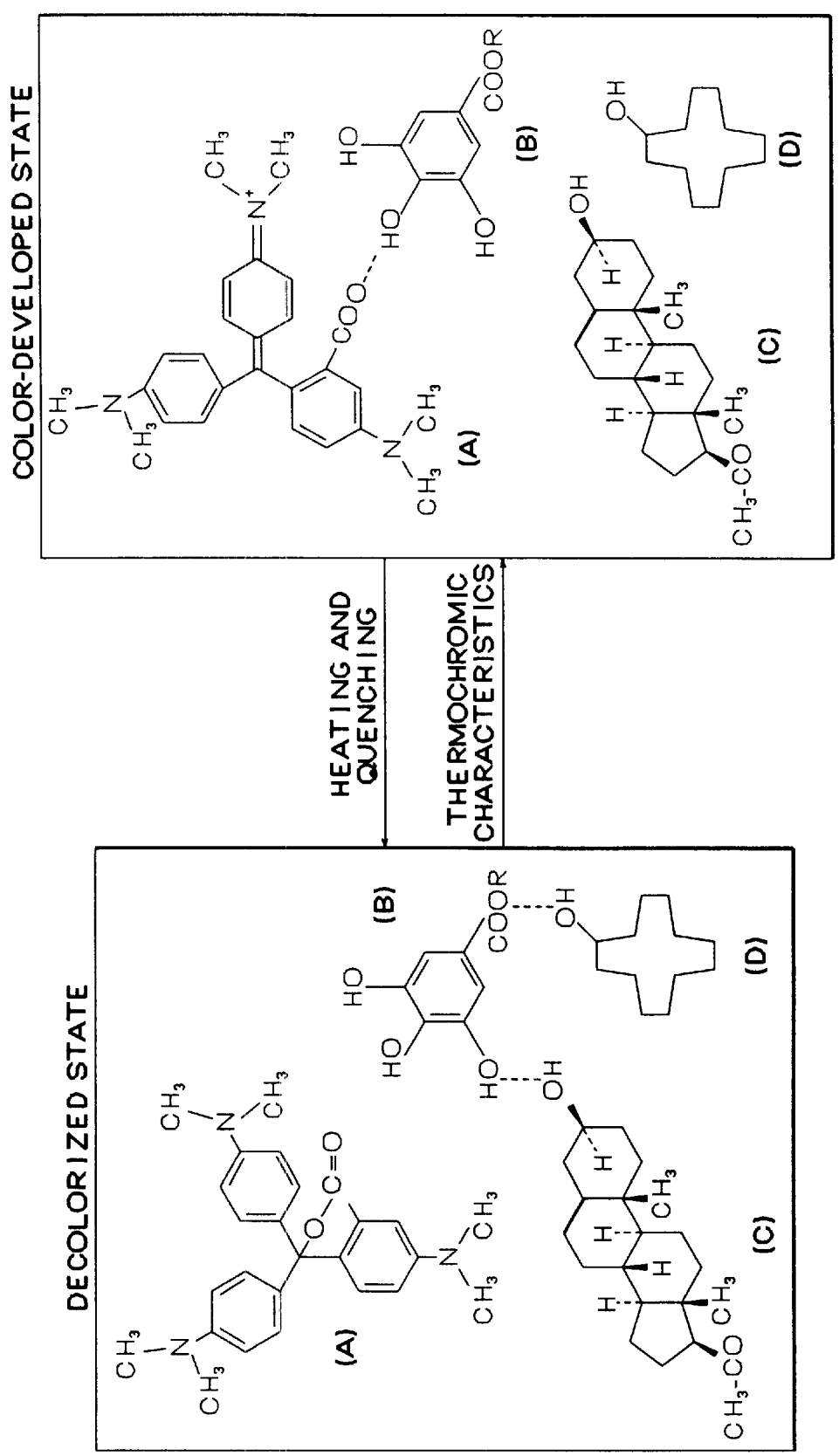
FIG. 1 is an explanatory view illustrating the principle of the color-developed state and decolorized state of the temperature indicating material (member) according to the present invention.

The embodiments of the present invention will next be described based on the drawings. The temperature indicating materials according to these embodiments each has a system as shown in FIG. 1 and is obtained by adding, to a rewritable basic system composed of an electron donating compound A (which will hereinafter be called "leuco dye A"), an electron accepting compound B (which will hereinafter be called "developer B") and a reversal material C, a thermochromism controller D and a binder resin. The reversal material means a material that causes reversible transformation between crystal and amorphous with respect to a part or all of the composition system, or reversible transformation between phase separation and non-phase-separation.

In these embodiments, crystal violet lactone (CL), propyl gallate (PG), pregnenolone (PRN) and cyclododecanol (CD) are used as the leuco dye A, developer B, reversal material C and thermochromism controller D, respectively. The propyl gallate (PG) employed here is soluble in molten cyclododecanol (CD). In a decolorized mode, the mutual action between the leuco dye A and developer B is small, while the developer has heightened mutual action with the reversal material C and thermochromism controller D. In a color development mode, on the other hand, the mutual action between the leuco dye A and developer B is strong, while that between the developer B with the reversal material and thermochromism controller D is small. By heating and quenching, the developer B is absorbed in the reversal material C and thermochromism controller D which are molten at the time of heating and the reversal material C and thermochromism controller D are solidified by quenching while absorbing therein the developer B. Since the solidified condition is amorphous and is therefore not stable, the phase separation between the developer B and the thermochromism controller D and reversal material C proceeds, depending on temperature and time. The thermochromism controller D which undergoes phase separation crystallizes at an environmental temperature because of its stable crystal condition. The crystallized thermochromism controller D provides a place for the reaction between the leuco dye A and developer B, while maintaining weak mutual action with the developer B, and accelerates the association of the leuco dye A with the developer B. The term "place for the reaction" as used herein means a place where the reaction between the leuco dye A and the developer B is allowed to proceed on the surface of the thermochromism controller D.

A description will next be made of the action in the place for the reaction. When the thermochromism controller D becomes amorphous (decolorized) while heightening the mutual action with the reversal material C and developer B and then undergoes phase separation by exposure to high temperatures, the surface energy on the surface of the thermochromism controller D is largely activated and heightens the mutual action with the developer B which has also undergone phase separation. Owing to stable crystal conditions, the thermochromism controller D has reduced surface energy during the progress of the crystal growth, whereby the developer B is separated from the thermochromism controller D and bound to the leuco dye A to bring about color development. In other words, the thermochromism controller D which has undergone phase separation is presumed to serve as an accelerator of the color development after exposure to high temperatures in order to provide a place for association (a place for reaction) of the leuco dye A with the developer B.

When the leuco dye A, developer B and thermochromism controller D are mixed in a solid form, a place for reaction is provided for the leuco dye A and developer B so that color development is observed. In a similar method, it is possible to confirm whether another material can provide the place for reaction.

Figure 2:
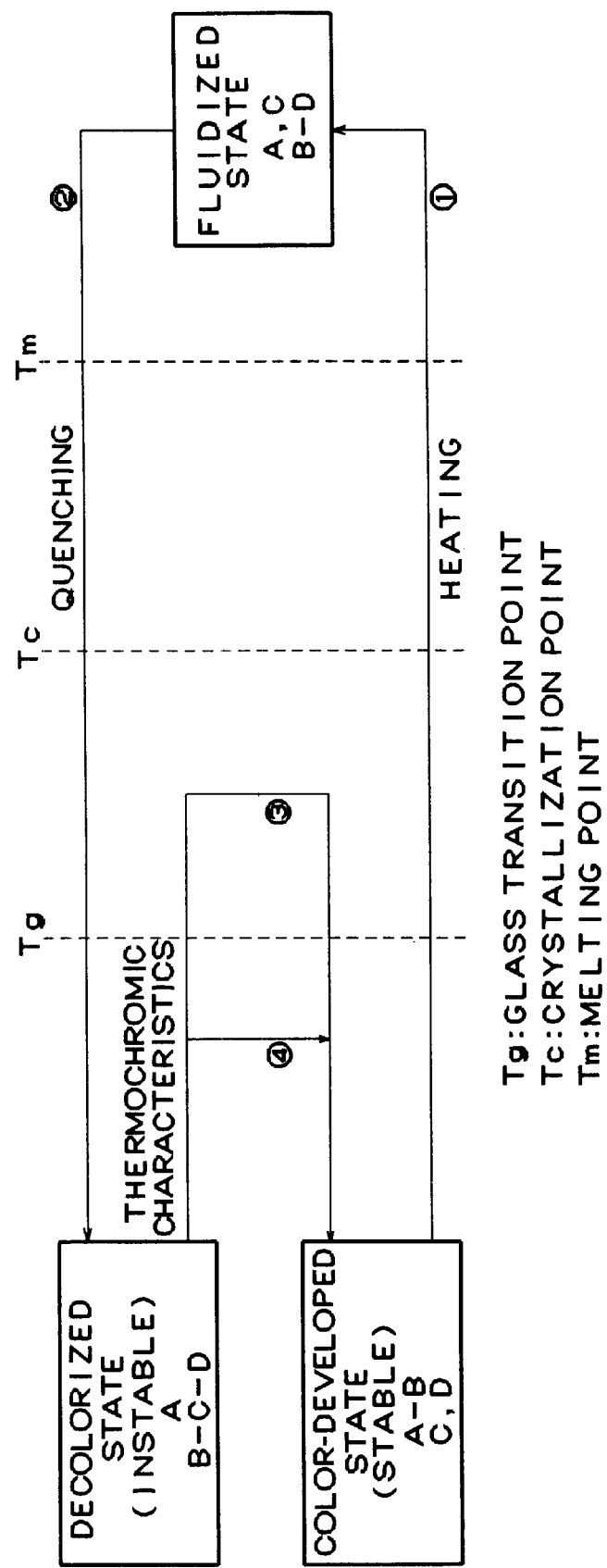
FIG. 2 is an explanatory view illustrating the change between the color development and decolorization based on the thermal conditions of the temperature indicating material (member) according to the present invention.

A description will next be made of the thermodynamic reversibility of this system with reference to FIG. 2. Under the color developed condition, the developer B and leuco A have strong mutual action, while the reversal material C and thermochromism controller D exists independently in the crystal form. Heating of this temperature indicating material to the melting point Tm or higher (shown by ①) fluidizes the material, which lowers the mutual action between the developer B and the leuco dye A while heightens the mutual action of the developer B with the thermochromism controller D and reversal material C which have been molten by heating, resulting in decolorization. By quenching (as shown by ②) thereafter, the developer B solidifies in the amorphous state while being absorbed in the reversal material C and thermochromism controller D and the decolorized state is maintained. Heating (as shown by ③) to a temperature not lower than the glass transition point Tg then causes separation of the developer D from the reversal material C and thermochromism controller D, followed by the initiation of drastic diffusion, whereby color development proceeds. The diffusion rate of the developer B shows a drastic change at a temperature around the glass transition point Tg. Since the reversal material C and thermochromism controller D have stable crystal conditions, color development proceeds even at a temperature not higher than the glass transition point Tg (as shown in (④) and in this area, the material exhibits time- and temperature-dependent thermochromism. Crystallization of the thermochromism controller D, which undergoes phase separation from the amorphous condition of the developer B, reversal material C and thermochromism controller D in the area having thermochromism at around or not higher than Tg, proceeds, since the crystal condition is stable under the measuring environment. The thermochromism controller D provides a place for the association, that is, a place for the reaction of the similarly separated developer B with the leuco dye A, thereby accelerating the progress of color development. The color developing rate accelerated by the thermochromism controller D is higher than that caused by the diffusion of the developer B and leuco dye A by the binder resin.

Since the mutual action among three components, that is, developer B, reversal material C and thermochromism controller D is large at the time of decolorization, the use of the developer B soluble in the thermochromism controller D facilitates the reaction among the three components, which makes it possible to carry out complete decolorization. Moreover, owing to the large mutual action between the thermochromism controller D and developer B, phase separation does not occur easily when the temperature is low. The progress of the color development of the temperature indicating material according to the present invention at low temperatures is slower than that of a temperature indicating material free of a thermochromism controller D. When exposed to high temperatures, the thermochromism controller D crystallizes relatively promptly, losing mutual action with the reversal material C and developer B, since the thermochromism controller D has a crystallizing point and melting point lower than those of the reversal material C. During crystallization, the thermochromism controller D provides a place for reaction, which increases the number of the chances to associate the developer B, which has undergone phase separation, with the leuco dye A, thereby accelerating the progress of the color development. In this manner, the thermochromism controller D is sensitive to temperature, more specifically, retards the progress of color development at low temperatures, but accelerates the progress of color development at high temperatures.

In the system of these embodiments, reflectance upon decolorization is improved by adding, as the thermochromism controller D, cyclododecanol (CD) to a rewritable temperature indicating material and employing an electron donating compound (developer B) which dissolves therein an electron accepting compound (developer B). When the temperature indicating material is exposed to high temperatures after decolorization, phase separation of the thermochromism controller D occurs and it provides a place for the reaction, which makes it possible to proceed the color development sufficiently.

A temperature monitoring material makes use of the color development mechanism of the temperature indicating material as follows: thermal energy is applied to the temperature indicating material, which is under a color developing condition, as shown in FIG. 1 by heating means such as thermal head to a temperature not lower than the melting point of the temperature indicating material; the electron donating compound (leuco dye A) and electron accepting compound (developer B) are solidified by quenching while being separated from each other; the material is initialized to be a transparent condition; and the color development degree of the initialized part changes, depending on the reaction amount of the electron donating compound (leuco dye A) with the electron accepting compound (developer B) which varies with temperature and time.

In general, the strength of reflected light can be represented by the following equation:

$$I = RI_0 \cdot e^{-2\epsilon cd} \tag{1}$$

wherein, $I_0$: irradiated light, E: molar absorption coefficient, c: molar concentration, d: ink film thickness and R: reflectance of substrate. $\epsilon$ shows a time- and temperature-dependent change after decolorization and this fact is utilized by a temperature indicating material.

The present invention will hereinafter be described more specifically by examples. The temperature indicating material is composed of a leuco dye A, a developer B, a reversal material C, a thermochromism controller D (cyclododecanol) and a binder resin.

EMBODIMENT 1

EXAMPLE 1

| | |
|---|---|
| Leuco Dye A: "GN-2" (trade name; product of Yamamoto Chemicals, Inc.) | 1 part by weight |
| Developer B: PG (Propyl gallate) | 1 part by weight |
| Reversal material C: PRN (pregnenolone) | 10 parts by weight |
| Thermochromism controller D: CD (cyclododecanol) | 5 parts by weight |
| Binder resin: A-91 (styrene-methacrylic acid copolymer, methacrlic acid: 10%) | 4 parts by weight |

COMPARATIVE EXAMPLE 1

| | |
|---|---|
| Leuco Dye A: "GN-2" (trade name; product of Yamamoto Chemicals, Inc.) | 1 part by weight |
| Developer B: PG (Propyl gallate) | 1 part by weight |
| Reversal material C: PRN (pregnenolone) | 10 parts by weight |
| Phase separation controller: DOC (1-docosanol) | 5 parts by weight |
| Binder resin: A-91 (styrene-methacrylic acid copolymer, methacrylic acid: 10%) | 4 parts by weight |

COMPARATIVE EXAMPLE 2

| | |
|---|---|
| Leuco Dye A: "GN-2" (trade name; product of Yamamoto Chemicals, Inc.) | 1 part by weight |
| Developer B: PG (Propyl gallate) | 1 part by weight |
| Reversal material C: PRN (pregnenolone) | 10 parts by weight |
| Phase separation controller: SA (stearic acid) | 5 parts by weight |
| Binder resin: A-91 (styrene-methacrylic acid copolymer, methacrylic acid: 10%) | 4 parts by weight |

COMPARATIVE EXAMPLE 3

| | |
|---|---|
| Leuco Dye A: "GN-2" (trade name; product of Yamamoto Chemicals, Inc.) | 1 part by weight |
| Developer B: PG (Propyl gallate) | 1 part by weight |
| Reversal material C: PRN (pregnenolone) | 10 parts by weight |
| Phase separation: (thermochromism controller) | Not added |
| Binder resin: A-91 (styrene-methacrylic acid copolymer, methacrylic acid: 10%) | 4 parts by weight |

Each of the temperature indicating materials is prepared as follows: first, a coating solution is prepared by completely dissolving a binder resin in 84 parts by weight of a 4:1 mixed solvent of toluene and cyclohexanone, adding GN-2, PG, PRN, CD (or DOC or SA) to the resulting resin solution, charging glass beads of about Ø 3 mm to the resulting mixture to a height of the liquid surface, and stirring the mixture for about 2 hours in a paint shaker.

The coating solution thus obtained is applied to PET of 38 μm thick by a bar coater #40, followed by distillation of the solvent at about 70° C., whereby the temperature indicating material is prepared.

Figure 3:
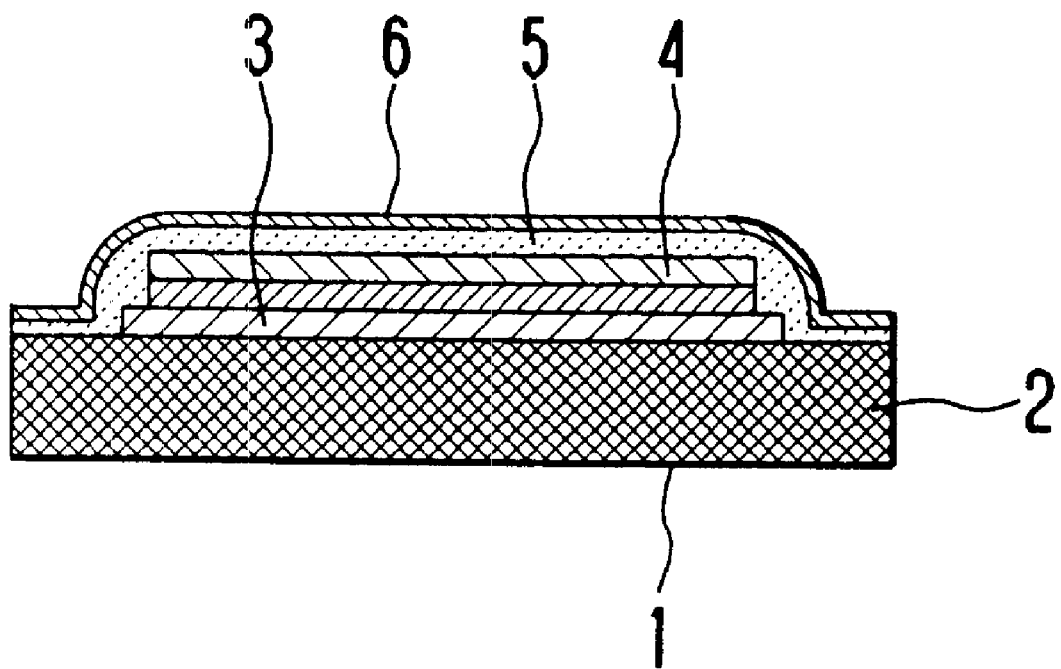
FIG. 3 is a cross-sectional view illustrating the temperature monitoring member in the form of a label, which has been prepared using the temperature indicating material (member) of the present invention.

Evaluation was carried out on the temperature monitoring material prepared from the resulting temperature indicating material. Each of the temperature monitoring materials was prepared, as shown in FIG. 3, by successively adhering, to a white PET base 2, a thermal diffusion preventive layer 3 and temperature indicating material 4 by using "My Tack Paper ML-10" (trade name; product of Nichiban Co., Ltd.). PEN (polyethylene naphthalate) 5 added with a sticking preventive layer 6 was laminated as a protecting layer against the discoloration by a thermal head. The sticking preventive layer 6 was formed by applying "TS-100" (trade name; product of Kuboko Paint Co., Ltd.), which had been diluted 5 times, by a bar coater #3, followed by drying at 80° C. (whereby the solvent was removed). Evaluated were discolorization characteristics (initialization) and thermochromism (after discolorization, reflectance of each sample was measured at 0, 10, 25 and 40° C., respectively, by a colorimeter (product of Minolta) and in addition, the reflectance of the sample of Example 1 was measured at 15 and 20° C.). In addition, presence or absence of color development was confirmed by weighing each of the leuco dye A, developer B, reversal material C and thermochromism controller D or phase separation controller in a sample bottle, sealing and shaking it and then allowing it to stand for a while, in order to confirm whether a place for the reaction is provided. When the color development is observed, it means that the thermochromism controller D or phase separation controller has provided the place for reaction (no color development was observed in Comparative Example 3 which was free of the thermochromism controller D or phase separation controller).

Decolorization Characteristics

Figure 4:
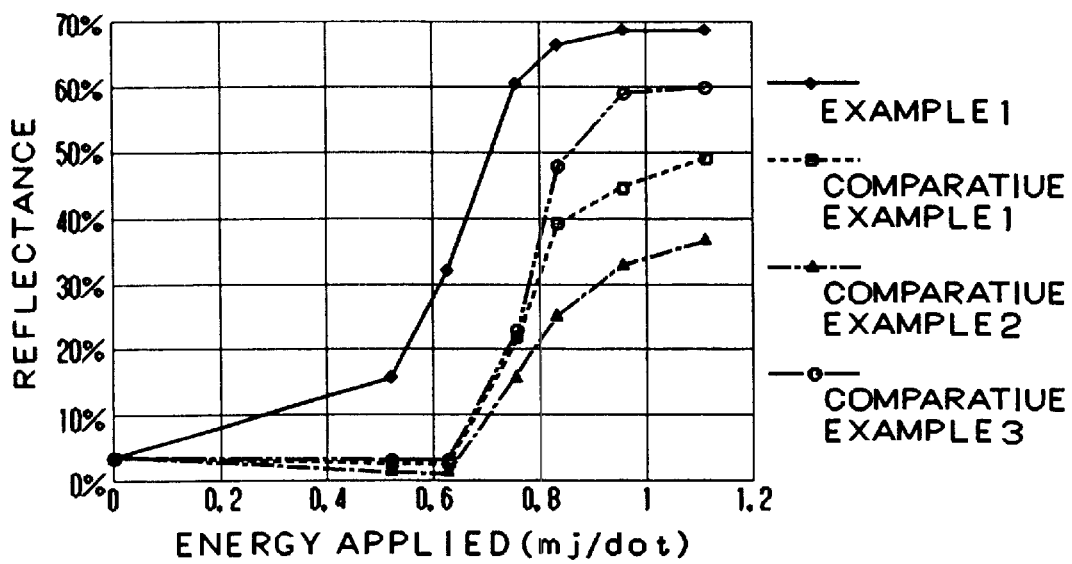
FIG. 4 is a graph illustrating the relationship between energy applied and reflectance of each material.

The decolorization characteristics of Example 1 and Comparative Examples 1 to 3 are shown in FIG. 4. In Comparative Example 3, the reflectance upon decolorization is saturated at around 1 mJ/dot, while color decolorization of the cyclododecanol (CD)-added temperature monitoring material prepared in Example 1 can be carried out by lower energy than that of Comparative Example 3, indicating that the reflectance upon decolorization is improved by the addition of cyclododecanol (CD) when the energy applied is the same. The temperature monitoring materials prepared in Comparative Examples 1 and 2 each needs an equal level of energy to that of Comparative Example 3 and reflectance upon decolorization is low (no complete decolorization).

Thermochromic Characteristics

Figure 5:
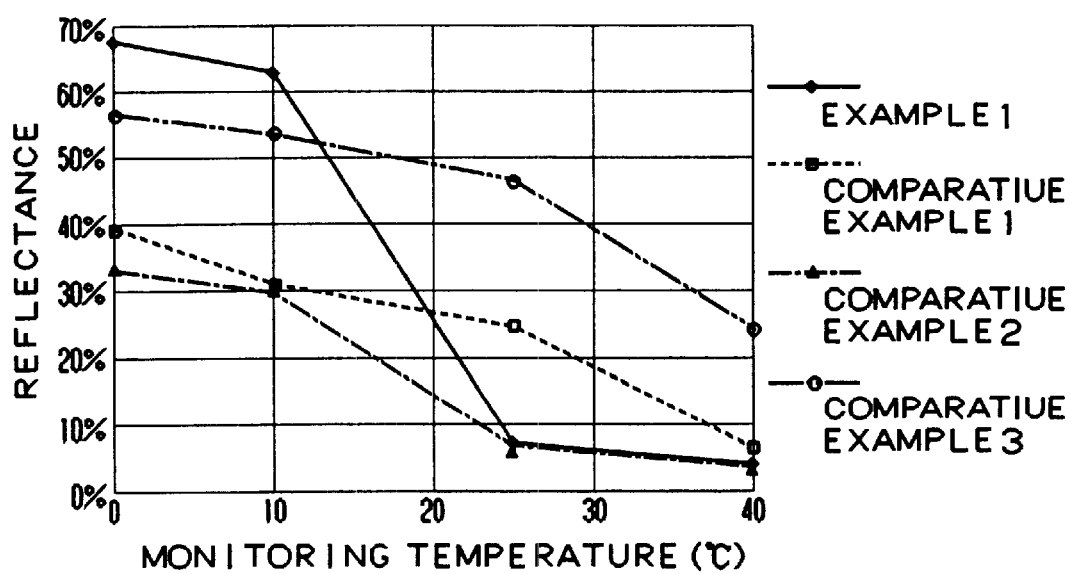
FIG. 5 is a graph illustrating the relationship between a monitoring temperature and reflectance of each material.
Figure 6:
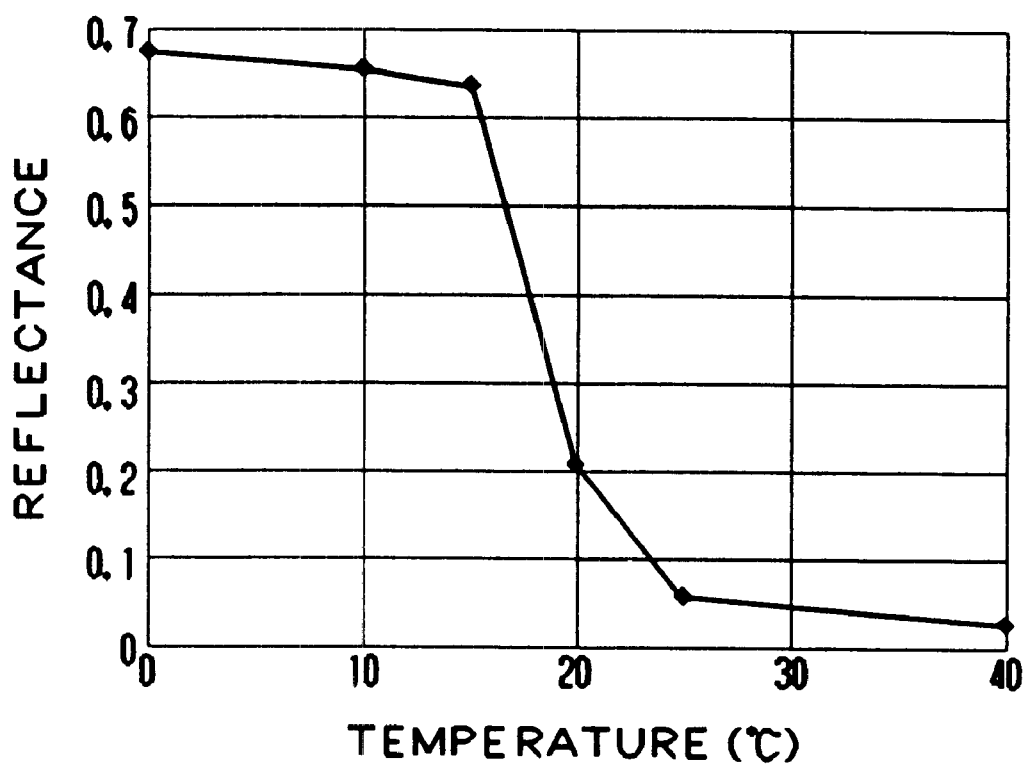
FIG. 6 is a graph illustrating the relationship between the temperature and reflectance of the temperature indicating material (member) of the present invention obtained in Example 1.

Thermochromic characteristics of each of the temperature monitoring materials prepared in Example 1 and Comparative Examples 1 to 3 are shown in FIG. 5. The reflectance after 24 hours at each temperature is shown in FIG. 5. In Comparative Example 1 free of the thermochromism controller D, the reflectance shows a substantially linear decrease at 0 to 25° C. and is about 25% at 40° C. Thus, the material is not sensitive to temperature. When a phase separation controller is added, the reflectance approaches about 40% even at a low temperature, which indicates that the color development progresses (the temperature monitoring material having 2,3,4,4' BHP, whose color development shows a relatively slow progress, as a developer B is omitted from the description, because it exhibited similar characteristics to the material prepared in Comparative Example 3 which does not develop color so much at high temperatures even if a phase separation controller is added). When a component material is selected so as to retard the color development at low temperatures, the color development at high temperatures inevitably becomes slow, while when the color development at high temperatures is accelerated, the color development at low temperatures inevitably proceeds. Thus, it is impossible to satisfy both of the requirements. On the contrary, the thermochromism controller D (CD) of Example 1 easily absorbs the developer B and at the same time, it provides a place for reaction after phase separation, so that color development tends to proceed as soon as the temperature becomes higher than that causing separation of CD. In FIG. 6, thermochromic characteristics of Example 1 are shown. From the drawing, it can be understood that the temperature indicating material of Example 1 has a reaction temperature between about 15° C. to 20° C. In FIGS. 7(A) and 7(B), the results of DSC (differential scanning calorimetry) of Example1 are shown. The glass transition point Tg was about 20° C. and crystallization point Tc was 66° C. The reaction proceeds at a temperature not higher than the glass transition point of 20° C. From these drawings, it has been found that at temperatures not lower than the glass transition point Tg, the association probability of the developer B with the leuco dye A increases by the addition of the thermochromism controller D (CD).

In Table 1, results of the evaluation whether a place for the reaction is provided or not and a ratio of the reflectance at 10° C. to that at 25° C. are shown.

TABLE 1

| | Place for reaction | Ratio of reflectance at 10° C. to 25° C. |
| --- | --- | --- |
| Example 1 | Provided | 9 |
| Comp. Ex. 1 | Not provided | 1.3 |
| Comp. Ex. 2 | Not provided | 4.3 |
| Comp. Ex. 3 | Not provided | 1.2 |

From Table 1, it has been found that in Comparative Examples, the thermochromism controller D cannot provide a place for reaction and a ratio of the reflectance at 10° C. to that at 25° C. is small, indicating that the materials obtained in Comparative examples are not sensitive to temperature.

As the thermochromism controller D, CD was employed in the above-described embodiment. Cyclododecane diol can also be employed as the thermochromism controller D. No limitation is imposed on the thermochromism controller D insofar as it, under molten state, permits the dissolution of the developer B therein at a high solubility and can provide a place for reaction after phase separation. As the reversal material C, it is possible to employ, in addition to PRN, cholesterol, stigma stylol, stanolone, β-sitosterol, methyl and rostendiol, estradiol, benzoate, pregnenolone acetate, androsterone, 11α-hydroxyprogesterone acetate, or esmilagenin.

EMBODIMENT 2

In Embodiment 1, described was a temperature indicating material which contains a thermochromism controller D capable of providing a place for reaction.

The material according to Embodiment 2 is obtained by adding, to a rewritable temperature indicating member, cyclododecanol or cyclododecane diol as the cycloalkanol or cycloalkane diol, in an amount not less than 1 part by weight but not greater than 20 parts by weight, preferably not less than 2.5 parts by weight but not greater than 10 parts by weight, each based on the electron accepting compound.

EXAMPLE 2

The present invention will hereinafter be described more specifically by the following example. The temperature indicating member comprises a leuco dye A, a developer B, a reversal material C, an alicyclic alcohol D for controlling the thermochromic characteristics and a binder resin. Temperature indicating member:

(1) Preparation of a Coating Solution and Temperature Indicating Member

| | |
| --- | --- |
| Leuco Dye A: "GN-2" (trade name; product of Yamamoto Chemicals, Inc.) | 1 part by weight |
| Developer B: PG (Propyl gallate) | 1 part by weight |
| Reversal material C: PRN (pregnenolone) | 10 parts by weight |
| Alicyclic alcohol D: CD (cyclododecanol) | 5 parts by weight |
| Binder resin: A-91 (styrene-methacrylic acid copolymer, methacrylic acid: 10%) | 4 parts by weight |

A coating solution is prepared by completely dissolving a binder resin in 84 parts by weight of a 4:1 mixed solvent of toluene and cyclohexanone, adding GN-2, PG, PRN and CD to the resulting resin solution, charging glass beads of about Ø 3 mm to the resulting mixture to a height of the liquid surface, and stirring the mixture for about 2 hours in a paint shaker.

The coating solution thus obtained in (1) is applied to PET of 38 μm thick by a bar coater #40, followed by distillation of the solvent at about 70° C., whereby a temperature indicating is prepared.

(2) Preparation of a Temperature Monitoring Member

A temperature monitoring member 1 was prepared, as shown in FIG. 3, by successively adhering, to a white PET base 2, a thermal diffusion preventive layer 3 and temperature indicating material 4 by using "My Tack Paper ML-10" (trade name; product of Nichiban Co., Ltd.). PEN (polyethylene naphthalate) 5 added with a sticking preventive layer 6 was laminated as a protecting layer against decolorization by a thermal head. The sticking preventive layer 6 was formed by applying "TS-100" (trade name; product of Kuboko Paint Co., Ltd.), which had been diluted 5 times, by a bar coater #3, followed by drying at 80° C. (whereby solvent was removed). The temperature monitoring member 1 was formed into a card as shown in FIG. 3 and evaluated with regards to the following items.

Color Development Characteristics

Figure 8:
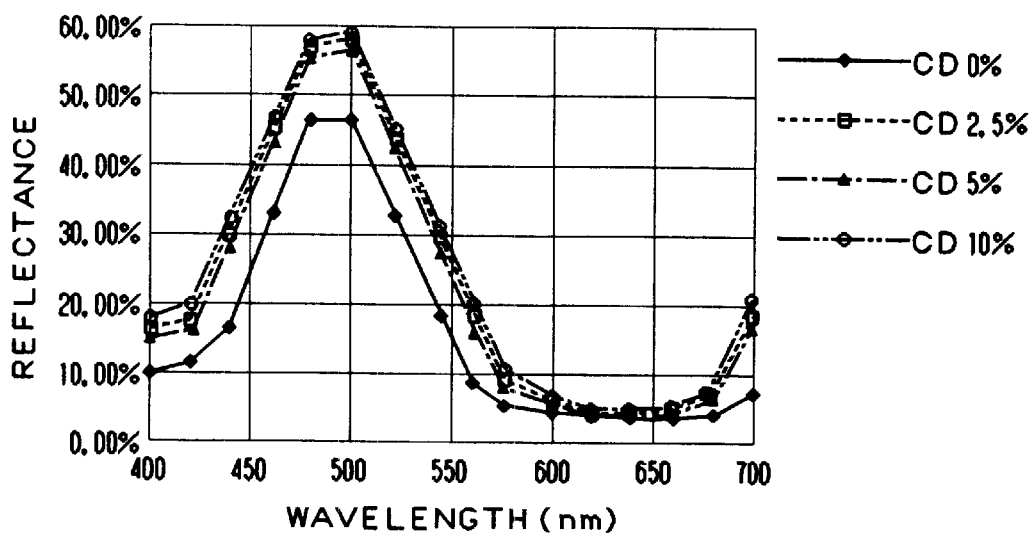
FIG. 8 is a graph illustrating the relationship between wavelength and reflectance, from which the influence of the thermochromism controller can be found.

In FIG. 8, illustrated is a distribution of reflectance upon color development, depending on the content of cyclododecanol. The reflectance was measured using "CM-503C" (trade name; product of Minolta). As can be seen from this drawing, the reflectance of the temperature monitoring material containing cyclododecanol (CD) was substantially similar to that of the temperature monitoring material free of cyclododecanol (CD) at around 630 nm to 670 nm which is a wavelength read by a bar code. Thus, the color development properties are free from the influence of cyclododecanol (CD).

Decolorization Characteristics

Figure 9:
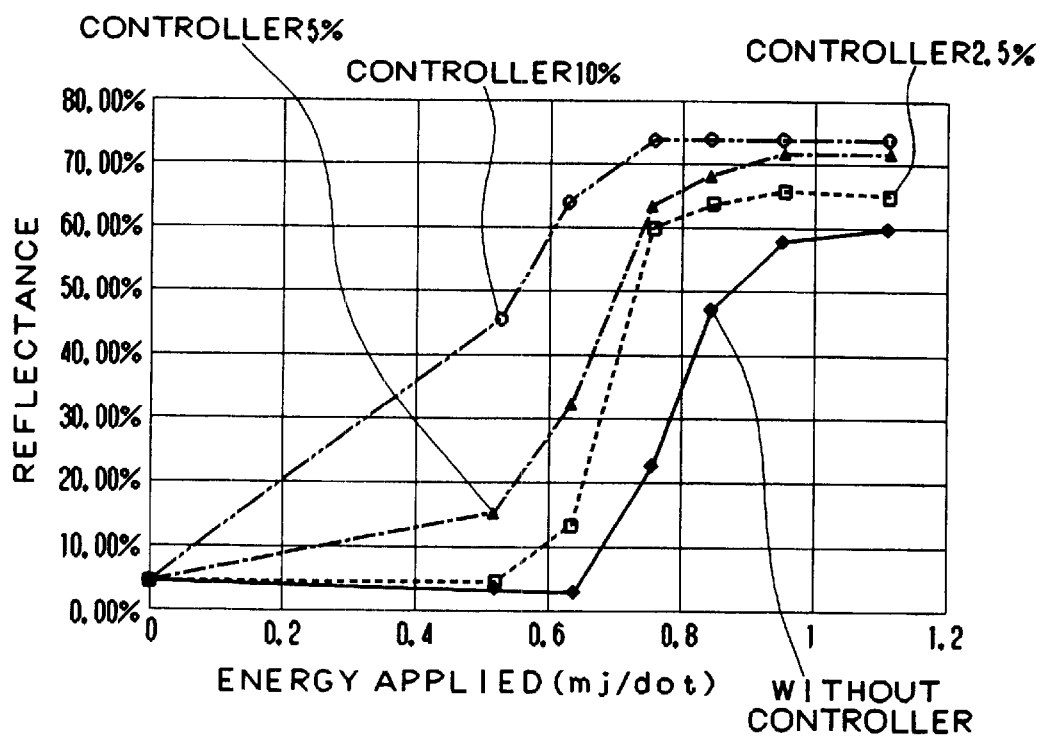
FIG. 9 is a graph illustrating the relationship between applied energy and reflectance, which indicates the decolorization characteristics of the temperature indicating member.

The decolorization characteristics of the temperature monitoring material 1 are shown in FIG. 9. The reflectance of the material free of the controller upon decolorization is saturated at around 1 mJ/dot. In the graph, reflectance of each of the materials which had been added with 2.5 to 10 parts by weights of cyclododecanol is illustrated. From the graph, it has been found that decolorization can be carried out at a lower energy when cyclododecanol (CD) is added and when the same energy is applied, the reflectance upon decolorization becomes higher with the amount of the cyclododecanol (CD).

Thermochromic Characteristics

Figure 10:
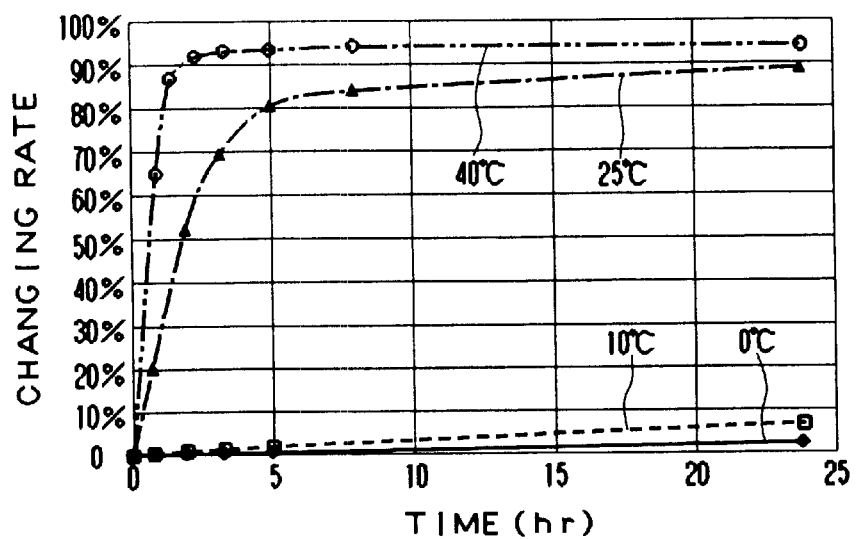
FIG. 10 is a graph illustrating the relationship between time and changing rate.
Figure 11:
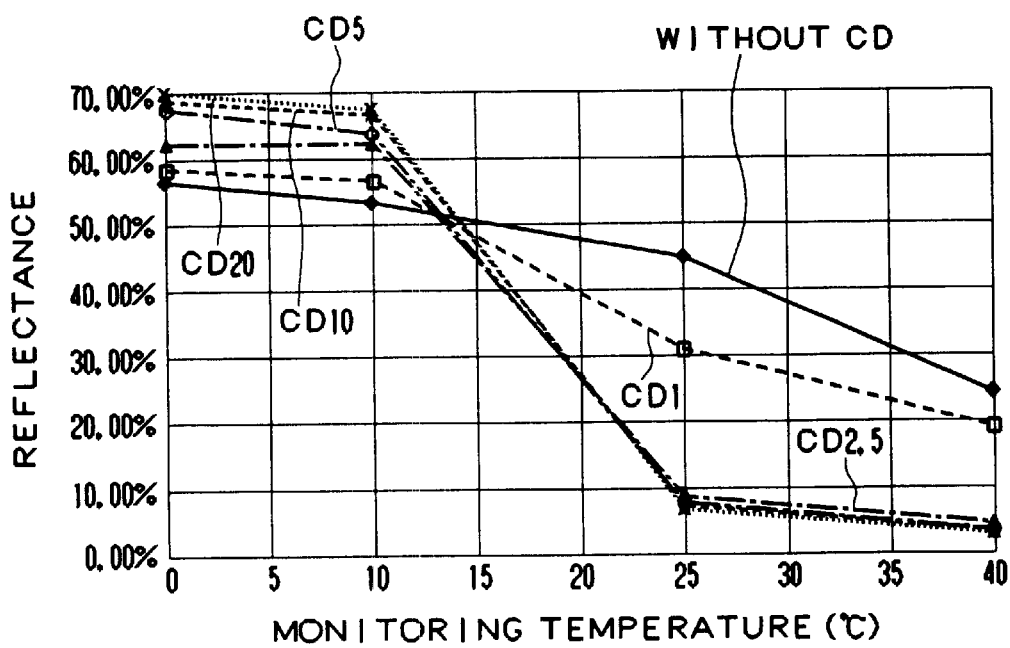
FIG. 11 is a graph illustrating the relationship between the monitoring temperature and reflectance after 24 hours.

Thermochromic characteristics of the temperature monitoring material are shown in FIGS. 10 and 11. FIG. 11 illustrates the relationship between time and changing ratio in the case where 5 parts by weight of cyclododecanol (CD) is added to 1 part by weight of the developer B and the resulting material is stored at each temperature.

The changing ratio can be calculated based on the following equation:

$$\text{Changing ratio (\%)} = \frac{(\text{Reflectance upon initialization}) - (\text{Reflectance upon measurement})}{(\text{Reflectance upon initialization}) - (\text{Reflectance upon application of a coating solution})} \times 100$$

From the graph, it has been found that at 10° C. or lower, color development hardly proceeded even after 24 hours, while at 25° C. or higher, it substantially proceeded after 24 hours. When the temperature monitoring material 1 stored at 25° C. and that stored at 40° C. are compared, color development reaches saturation in about 5 hours at 25° C., but 2 hours at 40° C. In FIG. 11, plotted are temperature and reflectance after 24 hours when cyclododecanol (CD) is added in an amount of 0, 1 (CD1), 2.5 (CD2.5), 5 (CD5), 10 (CD10) and 20 (CD20) parts by weight per 1 part by weight of the developer B. From this drawing, it has been found that the relationship between temperature and reflectance shows a linear change at 10° C. or higher when cyclododecanol (CD) is not added. The temperature monitoring material 1 free of cyclododecanol is not sensitive to temperature and it is therefore impossible to know definitely what environmental temperature it is exposed to. On the other hand, when cyclododecanol (CD) is added in an amount not less than 1 part by weight but not greater than 20 parts by weight, there exists a point between 10 to 25° C. at which the color development rate shows a drastic change, indicating that the material is more sensitive to temperature than that free of the alicyclic alcohol D. Thus, the thermochromic characteristics can be improved by the addition of cyclododecanol (CD). In addition, this drawing suggests that color development does not proceed so much at low temperatures and reflectance of the material added with cyclododecanol upon decolorization is larger than that of the material free of cyclododecanol.

Addition of cyclododecanol (CD) in an amount less than 1 part by weight per 1 part by weight of the developer B does not bring about any effect and no change can be found in the thermochromic characteristics. When cyclododecanol (CD) is added in an amount exceeding 20 parts by weight, the ink film loses adhesion and separation of it from the PET film 2 occurs. It is therefore desired to carry out improvement in the thermochromic characteristics and decolorization characteristics by adding cyclododecanol (CD) in an amount of 1 to 20 parts by weights, preferably 2.5 to 10 parts by weight.

In these examples, cyclododecanol (CD) was used as the alicyclic alcohol D. Similar effects were available by the use of cyclododecane diol.

EMBODIMENT 3

The present invention will be described more specifically by the following example. The temperature indicating member comprises a leuco dye A, a developer B, a reversal material C, a cycloalkanol or cycloalkane diol as the thermochromism controller D for controlling the thermochromic characteristics and a binder resin.

(1) Preparation of a Coating Solution and Temperature Indicating Member

| | |
|---|---|
| Leuco Dye A: "GN-2" (trade name; product of Yamamoto Chemicals, Inc.) | 1 part by weight |
| Developer B: PG (Propyl gallate) | 1 part by weight |

-continued

| | |
|---|---|
| Reversal material C: PRN (pregnenolone) | 10 parts by weight |
| Thermochromism controller D (cyclododecanol) | x parts by weight |
| Binder resin: A-91 (styrene-methacrylic acid copolymer, methacrylic acid: 10%) | 4 parts by weight |

A coating solution was prepared by completely dissolving a binder resin in 84 parts by weight of a 4:1 mixed solvent of toluene and cyclohexanone, adding GN-2, PG, PRN and CD to the resulting resin solution, charging glass beads of about Ø 3 mm to the resulting mixture to a height of the liquid surface, and stirring the mixture for about 2 hours in a paint shaker. The coating solution thus obtained was applied to PET of 38 μm thick by a bar coater #40, followed by drying, whereby a temperature indicating member was prepared.

Solubility

The solubility of propyl gallate (PG) in molten cyclododecanol (CD) was studied. In 1 g of cyclododecanol (CD), at least 0.8 g of propyl gallate (PG) was dissolved, indicating that an amount of cyclododecanol (CD) permitting dissolution of twice the amount of 1 part by weight of propyl gallate (PG) is at least 2.5 parts by weight. Here, temperature indicating members were prepared by adding cylododecanol (CD) in an amount permitting dissolution of 8 times the amount (Example 3), 4 times the amount (Example 4), twice the amount (Example 5), 1.2 times the amount (Example 6) and 0.8 time the amount (Example 7) of 1 part by weight of propyl gallate (PG), respectively. As shown in Table 1, the amounts of cyclododecanol (CD) practically added were, relative to 1 part by weight of propyl gallate (PG), 10 parts by weight in Example 3, 5 parts by weight in Example 4, 2.5 parts by weight in Example 5, 1.5 parts by weight in Example 6 and 1 part by weight in Example 7, respectively. As comparative examples, a temperature indicating material free of cyclododecanol (CD) and that containing 5 parts by weight of 1-docosanol, which is a linear saturated alcohol, instead of cyclododecanol (CD) were prepared in Comparative Example 4 and Comparative Example 5, respectively.

TABLE 2

| | Amount of CD | Amount of PG soluble in CD | Decolorization concentration (%) | 10° C./ 25° C. | Characteristics |
|---|---|---|---|---|---|
| Example 3 | 10 | 8 times | 73.6 | 9.5 | A |
| Example 4 | 5 | 4 times | 69.1 | 8.9 | A |
| Example 5 | 2.5 | 2 times | 66.1 | 7.1 | A |
| Example 6 | 1.5 | 1.2 times | 64.5 | 3.4 | B |
| Example 7 | 1 | 0.8 time | 63.7 | 1.8 | B |
| Comp. Ex. 4 | 0 | — | 60.5 | 1.2 | C |
| Comp. Ex. 5 | (5) | 1 time | 48.3 | 1.3 | C |

Evaluation was carried out using temperature monitoring members prepared from the resulting temperature indicating members. Described specifically, the temperature monitoring material 1 was prepared, as shown in FIG. 3, by successively adhering, to a white PET base 2, a thermal diffusion preventive layer 3 and temperature indicating material 4 by using "My Tack Paper ML-10" (trade name; product of Nichiban Co., Ltd.). PEN (polyethylene naphthalate) 5 added with a sticking preventive layer 6 was laminated as a protecting layer against the decolorization by a thermal head. The sticking preventive layer 6 was formed by applying "TS-100" (trade name; product of Kuboko Paint Co., Ltd.), which had been diluted 5 times, by a bar coater #3, followed by drying at 80° C. (whereby the solvent was removed). The temperature monitoring member 1 was formed into a card as shown in FIG. 3 and evaluated with regards to the following items.

Decolorization Characteristics

Figure 12:
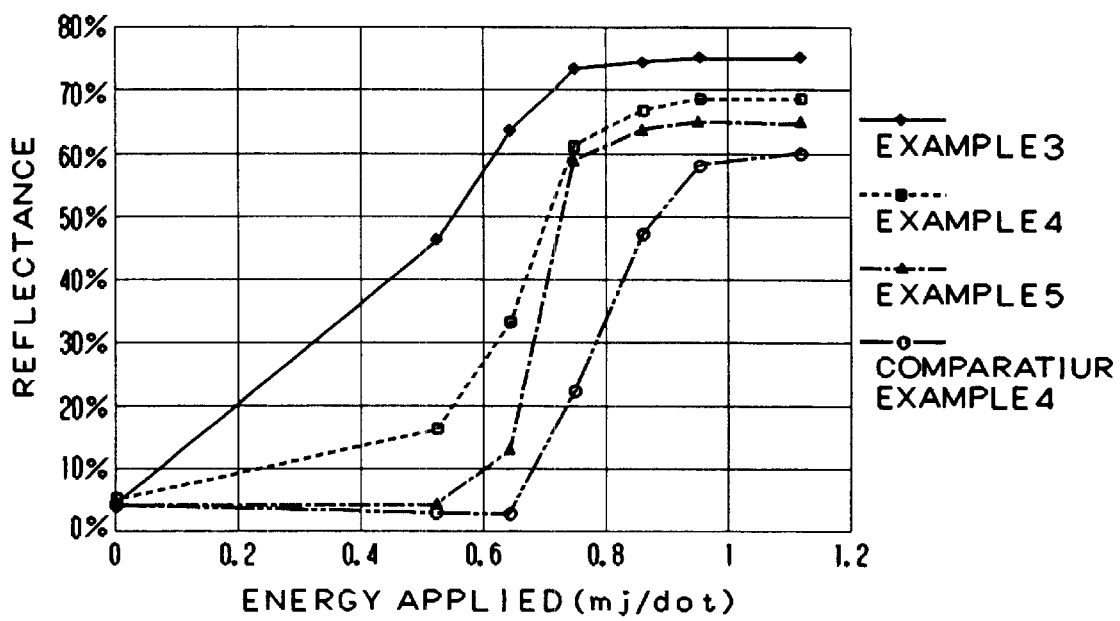
FIG. 12 is a graph illustrating the relationship between the applied energy and reflectance, of the temperature indicating members used in Embodiment 3.

Decolorization characteristics of the temperature monitoring materials of Examples 3 to 5 and Comparative Example 4 are shown in FIG. 12. In Comparative Example 4, reflectance upon decolorization shows saturation at about 1 mJ/dot. The temperature monitoring materials of Examples 3 to 5 added with cyclododecanol (CD), on the other hand, can be decolorized at lower energy. From the graph, it has been found that when the same energy is applied, reflectance upon decolorization is higher with an increase in the amount of cyclododecanol (CD).

Thermochromic Characteristics

Figure 13:
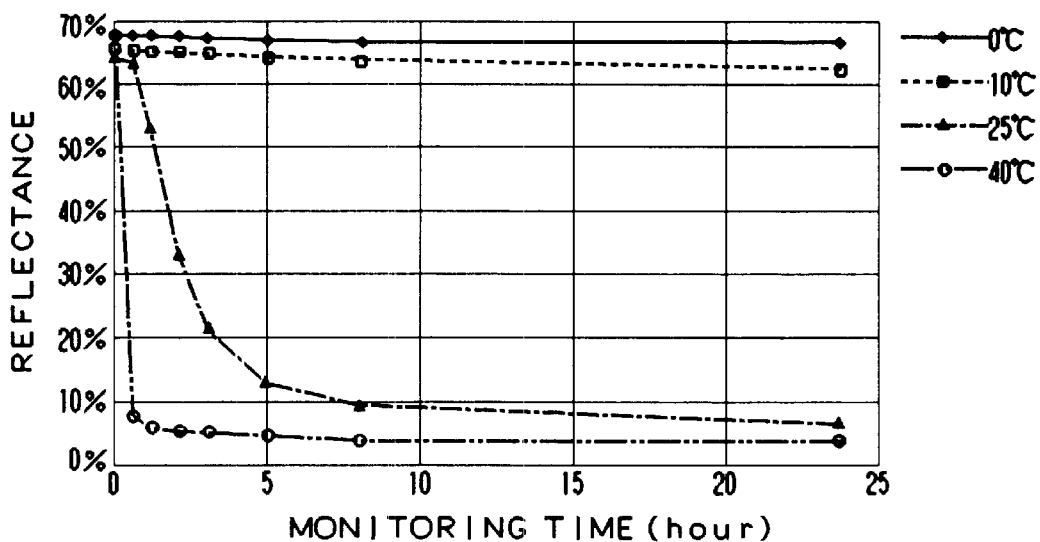
FIG. 13 illustrates thermochromic characteristics of the temperature controlling member of the present invention obtained in Example 4.
Figure 14:
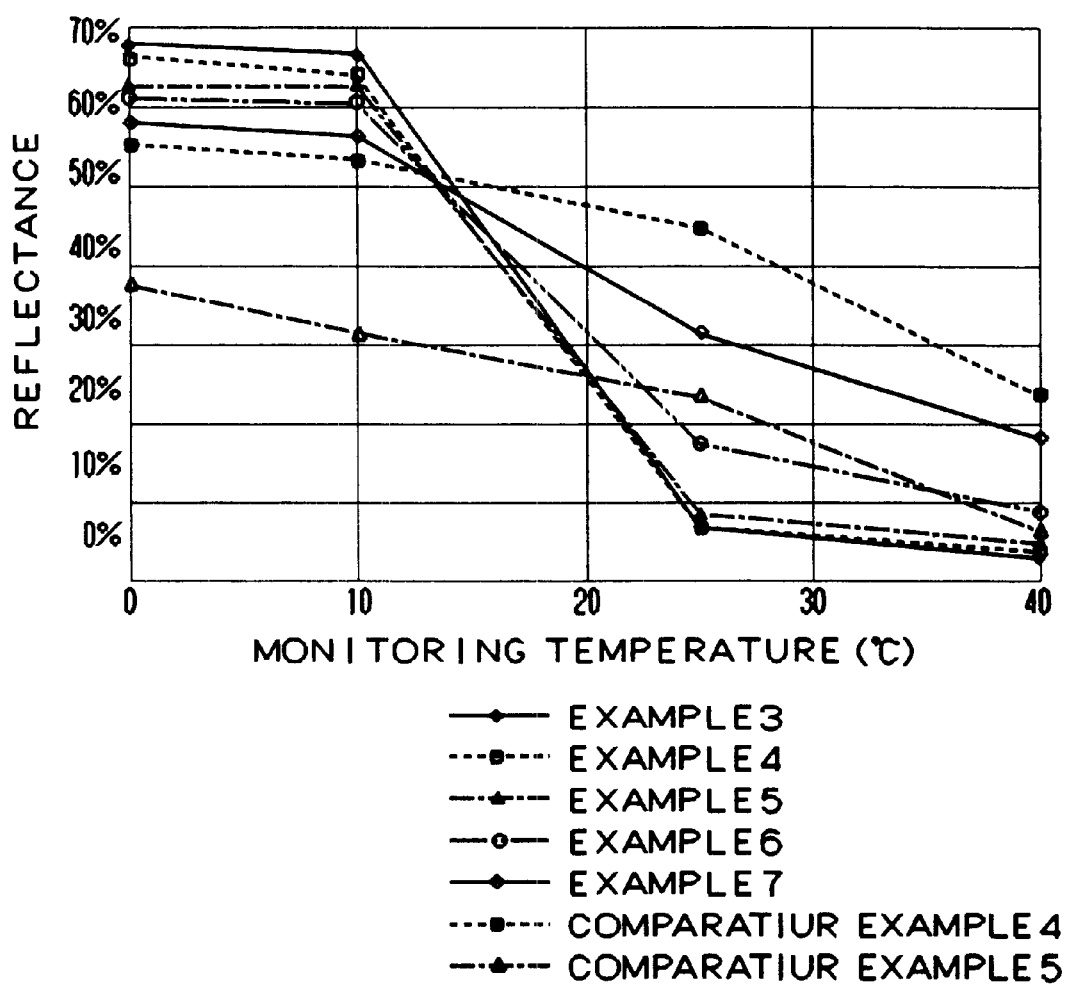
FIG. 14 is a graph illustrating the relationship between monitoring temperature and reflectance after 24 hours, of each of the temperature monitoring members obtained in Examples 3 to 7 and Comparative Examples 4 and 5.

In FIG. 13, relationship between monitoring time and reflectance in Example 4 is shown. From the graph, it has been found that color development hardly proceeded at 10° C. or lower even after 24 hours, while it substantially proceeded at 25° C. or higher after 24 hours. When the temperature monitoring materials 1 stored under environments at 25° C. and at 40° C. are compared, it takes 5 to 8 hours for saturation at 25° C., while color development substantially reaches saturation in about 1 hour at 40° C. In FIG. 14, relationship between monitoring temperature and reflectance after 24 hours in each of Examples 3to7 and Comparative Examples 4 and 5 is shown. From the drawing, it has been found that in Comparative Example 4 wherein no cyclododecanol was added, relationship between temperature and reflectance showed a linear change at 10° C. or higher, indicating that the temperature monitoring material free of cyclododecanol is not sensitive to temperature and it is therefore impossible to know definitely what environmental temperature it is exposed to. When 5 parts by weight of 1-docosanol is added (Comparative Example 5), color development proceeded in any temperature range and the relationship between temperature and reflectance is linear, indicating that the material is not sensitive to temperature. On the other hand, when cyclododecanol (CD) is added, there exists a point between 10 to 25° C. at which the color development rate shows a drastic change, indicating that addition of cyclododecanol makes the material more sensitive to temperature than that free of cyclododecanol (CD). In addition, this drawing suggests that color development does not proceed so much at low temperatures and reflectance of the material added with cyclododecanol is larger than that of the material free of cyclododecanol upon decolorization. When cyclododecanol (CD) is added in an amount of at least 2.5 parts by weight (Examples 3 to 5), reflectances of the materials at the monitoring temperature of 25° C. after 24 hours are not affected by the amount of cyclododecanol (CD) and therefore, do not differ largely and also do not differ from the reflectance at the monitoring temperature of 40° C. In short, complete decolorization occurs at the monitoring temperature of 25° C. after 24 hours when cyclododecanol (CD) is added in an amount of at least 2.5 parts by weight. At amounts of cyclododecanol (CD) not higher than 1.5 parts by weight (Examples 4 and 5), the reflectance at the monitoring temperature of 25° C. is high (indicating incomplete color development) and differs largely from reflectance at the monitoring temperature of 40° C. after 24 hours. Color development is not complete at the monitoring temperature of 25° C. for 24 hours, indicating that the sensitivity to temperature depends on the amount of cyclododecanol (CD).

In Table 2, the relationship among the amount of 1cyclododecanol (CD), reflectance upon decolorization and thermochromic characteristics is shown. When the amount of cyclododecanol is 1 part by weight (Example 7), only 0.8 part by weight of 1 part by weight of the developer B is dissolved therein, in other words, the dissolution of the developer B is not complete, leading to a low reflectance upon decolorization. In addition, mutual action among three components, that is, developer B, reversal material C and cyclododecanol (CD) is not so strong so that a ratio of reflectance at 10° C. to 25° C. after 24 hours is only 1.8. Cyclododecanol (CD) added in an amount of 1.5 parts by weight (Example 6) per 1 part by weight of the developer B can dissolve therein 1.2 parts by weight of the developer B so that complete dissolution of 1 part by weight of the developer B can be attained theoretically. It is however impossible to incorporate the whole amount of the developer B in cyclododecanol (CD) owing to diffusion-wise problem of the developer B under a fluid state and therefore, the effects of cyclododecanol are not complete. The reflectance upon decolorization is not so much improved and a ratio of reflectance at 10° C. to 25° C. after 24 hours is only 3.4. When cyclododecanol (CD) is added in an amount of 2.5 parts by weight or greater (Examples 3 to 5) relative to 1 part by weight of the developer B, it can dissolve therein at least twice the amount of the developer B (1 part by weight) so that the whole amount of the developer B can be incorporated in molten cyclododecanol. Its effects are stable. The reflectance upon decolorization is improved by about 10% compared with that of the material free of cyclododecanol (CD) and a ratio of reflectance at 10° C. to 25° C. after 24 hours is at least 7. If the reflectance upon decolorization is at least 65% and a ratio of reflectance at 10° C. to 25° C. after 24 hours is not less than 5, an improvement in the S/N ratio and sensitivity to temperature become definite and can be recognized visually so that addition of cyclododecanol (CD) in an amount not less than 2.5 parts by weight is desired.

By adding cyclododecanol (CD) which can dissolve therein the developer B when melted by heating, reflectance upon decolorization can be heightened and sensitivity to temperature can be improved. More preferably, relative to 1 part by weight of the developer B, cyclododecanol (CD) is added in an amount permitting the dissolution of at least twice the amount of the developer B.

A solubility in a molten cycloalkanol or cycloalkane diol varies, depending on the nature of the developer B added. In Table 3, shown is a solubility, in molten cyclododecanol (CD), of propyl gallate (PG), lauryl gallate (LG), bisphenol A (HBA) and 2,3,4,4'-tetrahydroxybenzophenone (2344) added as the developer B. Any developer B is soluble in molten cyclododecanol (CD) so that it is possible to improve the reflectance upon decolorization and sensitivity to temperature. To 1 part of propyl gallate (PG) added as the developer B1, at least 2.5 parts by weight (amount permitting dissolution of twice the amount of the developer B) of cyclododecanol (CD) must be added to bring about desired effects, which equally applies to another developer B. To 1 part of lauryl gallate (LG), at least 2 parts by weight (amount permitting dissolution of twice the amount of the developer B) of cyclododecanol (CD) must be added to bring about desired effects, judging from the solubility of lauryl gallate. Similarly, to 1 part of bisphenol A (HBA) and 2,3,4,4'-tetrahydroxybenzophenone (2344), at least 6.7 parts by weight and at least 10 parts by weight of cyclododecanol (CD) must be added, respectively. Thus, the amount of cyclododecanol (CD) which is effective for increasing the reflectance upon decolorization, thereby bringing about an improvement in the S/N ratio and sensitivity to temperature differs with the developer B. The amount of cyclododecanol (CD) is adjusted, depending on the nature of the developer B in order to bring about the above-described effects.

TABLE 3

|  | PG | LG | HBA | 2344 |
|---|---|---|---|---|
| Solubility | 8 | 10 | 3 | 2 |
| Necessity | 2.5 | 2 | 6.7 | 10 |

As the reversal material (C), not only PRN but also cholesterol, stigma stylol, stanolone, β-sitosterol, methyl androstendiol, estradiol, benzoate, pregnenolone acetate, androsterone, 11α-hydroxyprogesterone acetate, or esmilagenin can be used.

As the electron donating compound, not only leuco dye A (GN-2) but also materials capable of absorbing, upon color development, an irradiated light of a reader for bar code can be employed. More specifically, when a red light source is employed, leuco dye A which develops blue, black or bluish green color can be used.

As the leuco dye A for black color, the following ones can be used (not limited thereto):

PSD-150, PSD-184, PSD-300, PSD-802 and PSD-290 (each, trade name; product of Nippon Soda Co., Ltd.)

CP-101, BLACK-15 and ODB (each, trade name; product of Yamamoto Chemicals, Inc.)

BLACK-500 (trade name; product of Yamada Chemical Co., Ltd.)

TH-107 (trade name; product of Hodogaya Chemical Co., Ltd.)

As the leuco dye A for blue color, the following ones are usable (not limited thereto).

CL and BLMB (each, trade name; product of Nippon Soda Co., Ltd.), BLUE-63 and BLUE-502 (each, trade name; product of Yamamoto Chemicals, Inc.), BLUE-220 (trade name; product of Yamada Chemical Co., Ltd.) and BLUE-3 (trade name; product of Hodogaya Chemical Co., Ltd.).

As the leuco dye A for bluish green color, the following ones are usable (not limited thereto).

GN-169, GN-2 and Green-40 (each, trade name; product of Yamamoto Chemicals, Inc.)

Green-300 and Green-46 (each, trade name; product of Yamada Chemical Co., Ltd.)

Dyes of red or yellow color can be used if the wavelength of the light source of the reader is changed. The dyes may be used either singly or in combination.

As an example of the developer B which acts as an electron accepting compound in the present examples, PG was mentioned. The developer B is not limited thereto but usable examples include oxides of a phenol, a metal salt of a phenol, a metal salt of carboxylic acid, sulfonic acid, a sulfonate, phosphoric acid, a metal salt of phosphoric acid, an acid phosphate ester, a metal salt of an acid phosphate ester, a phosphite or a metal salt of phosphorous acid. Specific examples include 2,4-dihydroxyacetophenone (2,4-HAP), 2,5-HAP, 2,6-HAP, 3,5-HAP, 2,3,4-HAP, 2,4-dhydroxybenzophenone (2,4-HBP), 4,4'-HBP, 2,3,4-HBP, 2,4,4'-HBP, 2,2',4,4'-HBP, 2,3-dihydrobenzoicacid, methyl 3,5-dihydrobenzoate, 4,4'-biphenol and 2,3,4,4'-tetrahydroxybenzophenone.

The electron accepting compound largely affects the color development rate. Described specifically, the time from the separation of the electron accepting compound from the reversal material and thermochromism controller to the association with the electron donating compound and color development can be changed largely by the nature of the electron accepting compound. Temperature characteristics can be changed by selecting its material. A binder resin is selected according to the desired temperature characteristics. Examples of the binder resin include ethylene copolymers such as polyethylene, chlorinated polyethylene, ethylene-vinyl acetate copolymer and ethylene-acrylic acid-maleic anhydride copolymer, polybutadienes, polyesters such as polyethylene terephthalate, polybutylene terephthalate and polyethylene naphthalate, polypropylenes, polyisobutylenes, polyvinyl chlorides, polyvinylidene chlorides, polyvinyl acetates, polyvinyl alcohols, polyvinyl acetals, polyvinyl butyrals, fluorine resins, acrylic resins, methacrylic resins, acrylonitrile copolymers, styrenecopolymers such as polystyrene, halogenated polystyrene and styrene methacrylic acid copolymer, acetal resins, polyamides such as nylon 66, polycarbonates, cellulose resins, phenol resins, urea resins, epoxy resins, polyurethane resins, diaryl phthalate resins, silicone resins, polyimide amides, polyether sulfones, polymethyl pentenes, polyether imides, polyvinyl carbazoles and amorphous polyolefin. These resins may be used either singly or in combination.

In these examples, PET is used as a base material, but the base material is not limited thereto. In this example, the temperature monitoring material is in the form of a label, but it can be used in the form of a thermal transfer ink ribbon or in the form of a thermosensible paper having, thereon, a temperature indicating member and a diffusion layer therefor.

The temperature monitoring member 1 becomes sensitive to a predetermined temperature and has improved reflectance upon decolorization and therefore has an improved S/N ratio by using a temperature indicating material which has been obtained by adding to a mixture of an electron donating compound A, an electron accepting compound B and a reversal material C, a cycloalkanol or cycloalkane diol as a thermochromism controller D and by employing as the electron accepting compound B that permitting complete dissolution of it in molten cycloalkanol or cycloalkane diol.

As described above, the temperature indicating material according to the present invention is obtained by incorporating, in a rewritable base system which is composed of an electron donating compound, an electron accepting compound and a reversal material and undergoes color changes with time and temperature, a thermochromism controller for changing a rate of crystal to amorphous or phase separation to non phase separation. When the temperature indicating material undergoes color changes at an environmental temperature, the thermochromism controller provides a place for reaction after crystallization or phase separation, thereby contributing to the color change of the temperature indicating material. This makes it possible to improve the reflectance upon decolorization and in addition, owing to the place for reaction provided after phase separation, an area sensitive to the thermochromic characteristics appears, leading to an improvement an S/N ratio. The place for reaction upon decolorization due to an environmental temperature can be provided easily by the use of a cyclododecanol or cyclododecanediol as the therochromism controller.

The temperature monitoring member according to the present invention is prepared by using a temperature indicating member which contains an electron donating compound, an electron accepting compound and a reversal material, is initialized at the starting time of temperature monitoring and undergoes color changes with temperature and time and by printing or coating information to a base material. By incorporating, in the temperature indicating member, a cycloalkanol or cycloalkane diol which exhibits stable crystalline condition within a temperature monitoring range, the resulting temperature monitoring member becomes sensitive to temperature, which makes it possible to determine an environmental temperature for storage, though roughly. In addition, a reflectance upon decolorization is improved, which improves an S/N ratio when the condition upon color development is read mechanically. Even when the condition must be confirmed visually, the color development by exposure to high temperatures can be detected easily. Addition of the cycloalkanol or cycloalkane diol in an amount not less than 1 part by weight but not greater than 20 parts by weight based on 1 part by weight of the electron accepting compound makes it possible to determine the lower limit permitting the exhibition of thermochromic characteristics and moreover, makes it possible to determine the upper limit permitting the continued adhesion of an ink film of the temperature indicating material to the base material when the temperature monitoring member is formed as a label. If the dissolution of the electron accepting compound and the melting of the cycloalkanol or cycloalkane diol by heating are conducted simultaneously, reflectance upon decolorization is improved, which makes it possible to improve the S/R ratio when the color development is read mechanically. Even if the condition is visually confirmed, it becomes possible to easily detect the color development upon exposure to high temperatures and to specifically determine an environmental temperature for storage owing to the improved sensitivity to temperature. By controlling the amount of a cycloalkanol or cycloalkane diol depending on the nature of the electron accepting compound, the temperature indicating material thus obtained has increased sensitivity to temperature and can acquire a function of specifically determining an environmental temperature for storage.

The present invention may be embodied in other specific forms without departing from the spirit or essential characteristics thereof. The present embodiment is therefore to be considered in all respects as illustrative and not restrictive, the scope of the present invention being indicated by the appended claims rather than by the foregoing description and all changes which come within the meaning and range of equivalency of the claims are therefore intended to be embraced therein.

The present application is based on Japanese Priority Document Hei 11-028288 filed on Feb. 5, 1999, Hei 11-143316 filed on May 24, 1999, Hei 11-143317 filed on May 24, 1999 and Hei 11-362883 filed on Dec. 21, 1999 the content of which are incorporated herein by reference.

What is claimed is:

1. A temperature indicating material, comprising:
   a composition system including an electron donating compound and an electron accepting compound;
   a reversible material causing reversible transformation between crystal and amorphous with respect to a part or all of the composition system, or reversible transformation between phase separation and non-phase-separation; and
   a thermochromism controller including cyclododecanol or cyclododecane diol,
   wherein the temperature indicating material undergoes color changes according to temperature and time after initialization.

2. A temperature monitoring member, comprising:
   a base; and
   a temperature indicating member formed on the base, the temperature indicating member, comprising:
      a composition system, including an electron donating compound and an electron accepting compound;
      a reversible material causing reversible transformation between crystal and amorphous with respect to a part or all of the composition system, or reversible transformation between phase separation and non-phase-separation; and
      a thermochromism controller including cycloalkanol or cycloalkane diol for existing crystal conditions within a temperature monitoring range,
   wherein the temperature indicating member undergoes color changes according to temperature and time after initialization.

3. The temperature monitoring member according to claim 2, wherein the cycloalkanol or cycloalkane diol is cyclododecanol or cyclododecane diol, respectively.

4. The temperature monitoring member according to claim 2, wherein the cycloalkanol or cycloalkane diol is added in an amount not less than 1 part by weight but not greater than 20 parts by weight based on 1 part by weight of the electron accepting compound.

5. The temperature monitoring member according to claim 3, wherein the cycloalkanol or cycloalkane diol is added in an amount not less than 1 part by weight but not greater than 20 parts by weight based on 1 part by weight of the electron accepting compound.

6. The temperature monitoring member according to claim 2, wherein heating and melting of the cycloalkanol or cycloalkane diol and dissolution of the electron accepting compound are carried out simultaneously.

7. The temperature monitoring member according to claim 6, wherein the temperature indicating member containing the cycloalkanol or cycloalkane diol is employed in a controlled amount depending on the type of the electron accepting compound.

* * * * *